(12) United States Patent
Farineau

(10) Patent No.: US 9,216,495 B2
(45) Date of Patent: Dec. 22, 2015

(54) SPACER

(71) Applicant: General Electric Company, Schenectady, NY (US)

(72) Inventor: Thomas Joseph Farineau, Schoharie, NY (US)

(73) Assignee: General Electric Company, Schenectady, NY (US)

( * ) Notice: Subject to any disclaimer, the term of this patent is extended or adjusted under 35 U.S.C. 154(b) by 240 days.

(21) Appl. No.: 13/937,528

(22) Filed: Jul. 9, 2013

(65) Prior Publication Data

US 2015/0013139 A1 Jan. 15, 2015

(51) Int. Cl.
| | | |
|---|---|---|
| F16L 23/00 | (2006.01) | |
| F16D 1/033 | (2006.01) | |
| B25B 11/02 | (2006.01) | |
| F16L 9/18 | (2006.01) | |
| F16D 1/076 | (2006.01) | |

(52) U.S. Cl.
CPC ............... *B25B 11/02* (2013.01); *F16D 1/076* (2013.01); *F16L 9/18* (2013.01); *F16L 23/003* (2013.01); *F16D 1/033* (2013.01); *Y10T 29/49879* (2015.01); *Y10T 29/49902* (2015.01); *Y10T 29/53917* (2015.01); *Y10T 403/64* (2015.01)

(58) Field of Classification Search
CPC .......... F16D 1/033; F16D 1/02; F16L 23/003; F16L 23/006; F16L 23/02; F16L 23/162; F16L 23/18; F16L 23/20; F16L 21/00; F16L 21/02; F16L 25/0018; F16L 25/12; Y10T 29/53917; Y10T 29/49895; Y10T 29/49899; Y10T 29/49902; Y10T 29/49881; Y10T 29/49893; Y10T 403/64; Y10T 403/642; Y10T 403/645

USPC .......... 285/368, 123.1, 123.15, 123.3, 123.4; 403/337, 335, 336

See application file for complete search history.

(56) References Cited

U.S. PATENT DOCUMENTS

| | | | | |
|---|---|---|---|---|
| 1,098,299 | A * | 5/1914 | Powell | 285/337 |
| 2,650,111 | A * | 8/1953 | Kaiser | 285/47 |
| 2,796,748 | A * | 6/1957 | Sheppard | 464/182 |
| 2,900,199 | A * | 8/1959 | Logan | 277/614 |
| 3,068,689 | A * | 12/1962 | Warsaw | 73/862.12 |
| 4,573,527 | A * | 3/1986 | McDonough | 165/154 |
| 4,611,830 | A * | 9/1986 | von Ahrens | 285/22 |
| 4,652,019 | A * | 3/1987 | von Ahrens | 285/22 |
| 5,090,612 | A * | 2/1992 | Jones | 228/184 |
| 5,934,334 | A * | 8/1999 | Gray et al. | 138/112 |
| 6,367,846 | B1 * | 4/2002 | Aaron, III | 285/123.15 |
| 6,481,762 | B1 * | 11/2002 | Rex et al. | 285/337 |
| 6,571,832 | B1 * | 6/2003 | Elliott | 138/108 |
| 6,648,540 | B2 * | 11/2003 | Brisson et al. | 403/16 |

(Continued)

FOREIGN PATENT DOCUMENTS

EP 1191230 A1 * 3/2002 ............. F04D 29/04

*Primary Examiner* — Essama Omgba
(74) *Attorney, Agent, or Firm* — Ernest G. Cusick; Hoffman Warnick LLC

(57) ABSTRACT

A spacer for holding an alignment of two concentric cylinders including at least two arcuate spacer segments, each of the at least two arcuate spacer segments having at least one spacer passage for receiving a part of a coupling bolt, each of the at least two arcuate spacer segments fitting between each of two respective end surfaces of two concentric cylinders, each end surface having a cylindrical seat; and a ring with an outer surface adjoining an inner surface of each of the at least two arcuate spacer segments.

19 Claims, 4 Drawing Sheets

(56) References Cited

U.S. PATENT DOCUMENTS

| | | | |
|---|---|---|---|
| 6,837,644 B2* | 1/2005 | White et al. | 403/337 |
| 6,869,081 B1* | 3/2005 | Jenco | 277/611 |
| 7,225,837 B1* | 6/2007 | Kane | 138/112 |
| 7,530,757 B2* | 5/2009 | Toda et al. | 403/23 |
| 7,828,339 B2* | 11/2010 | Dole | 285/368 |
| 7,874,759 B2* | 1/2011 | Bengtsson | 403/335 |
| 8,109,337 B2* | 2/2012 | Parlee | 166/379 |
| 8,434,964 B2* | 5/2013 | Graham et al. | 403/337 |
| 8,479,829 B2* | 7/2013 | Stachowiak et al. | 166/379 |
| 8,732,927 B2* | 5/2014 | Graham et al. | 29/401.1 |
| 2003/0053852 A1 | 3/2003 | Brisson et al. | |
| 2003/0228188 A1* | 12/2003 | White et al. | 403/335 |
| 2004/0150226 A1* | 8/2004 | Hystad | 285/368 |
| 2008/0093847 A1* | 4/2008 | Sundholm | 285/368 |
| 2010/0059988 A1* | 3/2010 | Matsumoto et al. | 285/148.28 |
| 2012/0227536 A1* | 9/2012 | Jewett et al. | 74/572.2 |
| 2013/0071180 A1* | 3/2013 | Graham et al. | 403/335 |

* cited by examiner

SPACER

FIELD OF THE INVENTION

This invention relates generally to devices and methods for aligning concentric cylinders and more particularly to a spacer for holding an alignment of two concentric cylinders.

BACKGROUND OF THE INVENTION

Joining two concentric cylinders may be used, for example, in joining two rotors for the assembly of a steam or gas turbine. Another example may include joining two pipes in a piping system. Joining two concentric cylinders may require adjusting the combined length of the two concentric cylinders after the two concentric cylinders have been aligned. By inserting a spacer between the end surfaces of two concentric cylinders being joined, the width of the spacer may be used to adjust the combined length of the two concentric cylinders. Different widths of the spacer may be used to adjust the combined length either by machining the spacer or swapping out a different spacer with the required width. However, a unitary spacer between the two cylinders cannot be inserted and/or removed from between the two concentric cylinders without disturbing the alignment.

BRIEF DESCRIPTION OF THE INVENTION

A first aspect of the invention provides a spacer, the spacer comprising: at least two arcuate spacer segments, wherein each of the at least two arcuate spacer segments has at least one spacer passage for receiving a part of a coupling bolt, wherein the at least two arcuate spacer segments fit between each of two respective end surfaces of two concentric cylinders, each end surface having a cylindrical seat; and a ring with an outer surface adjoining an inner surface of each of the at least two arcuate spacer segments.

A second aspect of the invention provides a spacer for holding an alignment of two rotors each rotor having an end surface with a cylindrical seat, the spacer comprising: at least two arcuate spacer segments, wherein each of the at least two arcuate spacer segments has at least one spacer passage for receiving a part of a coupling bolt, wherein the at least two arcuate spacer segments fit between each of the respective end surfaces with the cylindrical seats; and a ring with an outer surface adjoining an inner surface of each of the at least two arcuate spacer segments.

These and other aspects, advantages and salient features of the invention will become apparent from the following detailed description, which, when taken in conjunction with the annexed drawings, where like parts are designated by like reference characters throughout the drawings, disclose embodiments of the invention.

BRIEF DESCRIPTION OF THE DRAWINGS

The above and other aspects, features and advantages of the invention will be better understood by reading the following more particular description of the invention in conjunction with the accompanying drawings.

Figure 1:
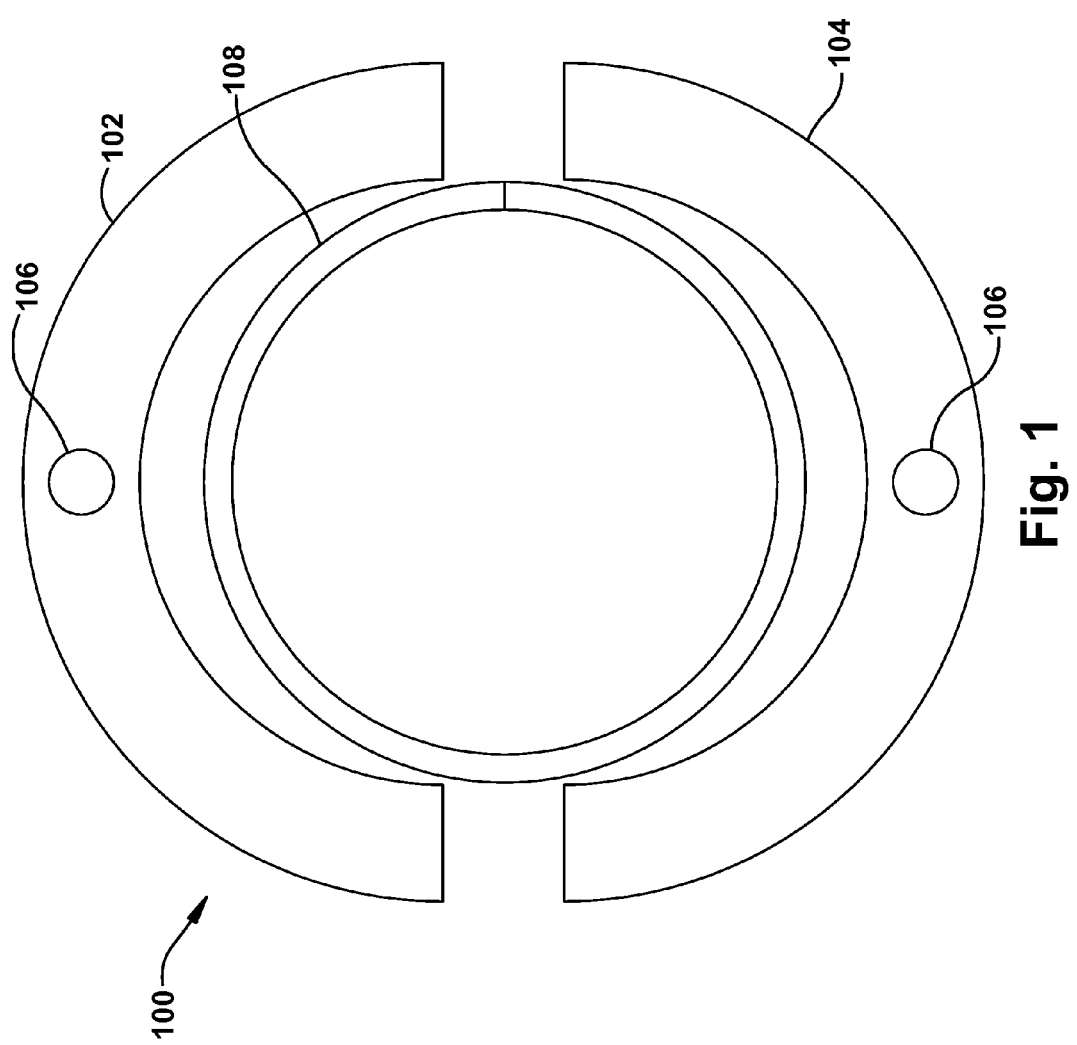
FIG. 1 shows an axial view of parts of a spacer in accordance with an embodiment of the present invention.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE INVENTION

Referring to FIG. 1, an axial view is shown of one embodiment of the parts of a spacer 100. Spacer 100 may include at least two arcuate spacer segments 102, 104. Each of the at least two arcuate spacer segments 102, 104 may include at least one spacer passage 106 for receiving a part of a coupling bolt (see 428 of FIG. 4). Spacer 100 may include a ring 108. The at least two arcuate spacer segments 102, 104 may include a machinable material, for example, a low alloy steel, a stainless steel, or a polymer.

Figure 2:
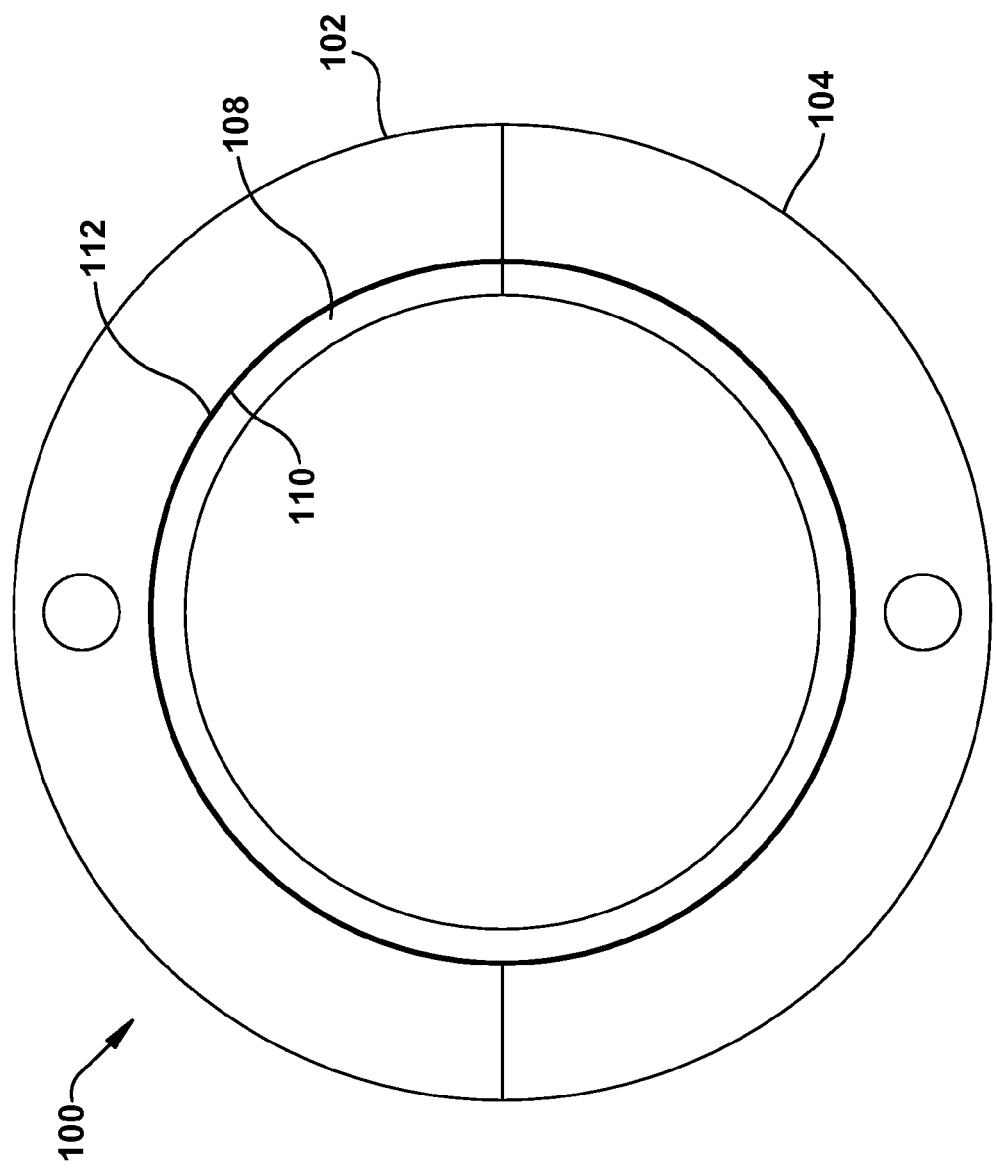
FIG. 2 shows an axial view of a spacer in accordance with an embodiment of the present invention.

Referring to FIG. 2, an axial view is shown of one embodiment of the spacer. In FIG. 2, the parts of the spacer 100 shown in FIG. 1 have been joined. As shown in FIG. 2, the at least two arcuate spacer segments 102, 104 collectively form an approximately 360 degree arc. Further, each arcuate spacer segment 102, 104 is no greater than a 180 degree arc. Accordingly, spacer 100 may include more than two arcuate spacer segments 102, 104 providing that the more than two arcuate spacer segments 102, 104 collectively form an approximately 360 degree arc and that each arcuate spacer segment 102, 104 is no greater than a 180 degree arc. An outer surface 110 of the ring 108 adjoins an inner surface 112 of each of the at least two arcuate spacer segments 102, 104.

Figure 3:
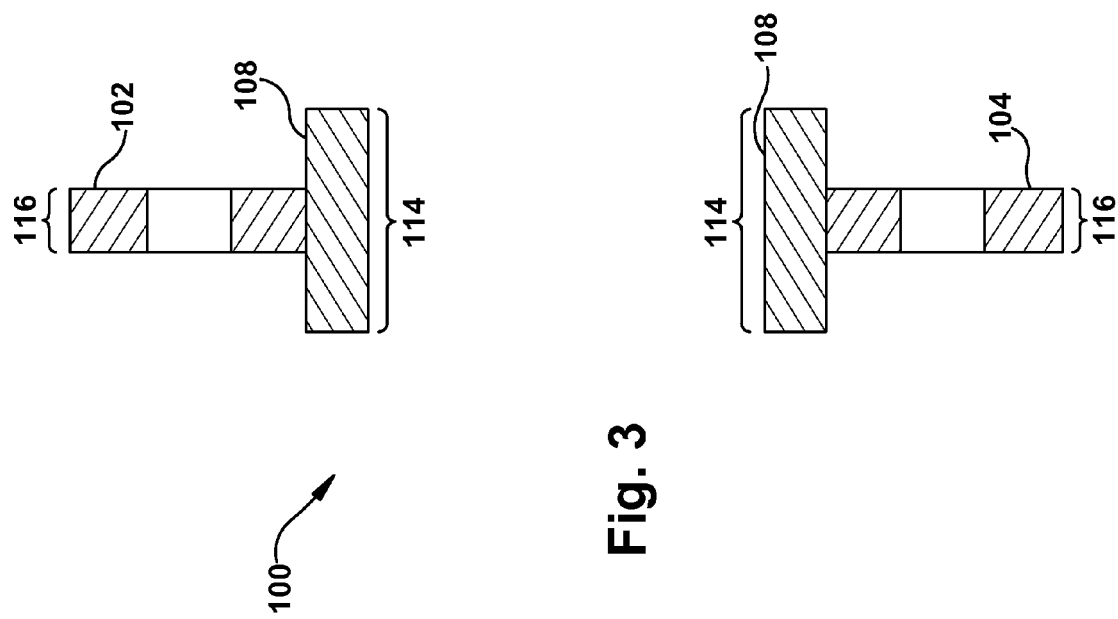
FIG. 3 shows a radial cross-sectional view of a spacer in accordance with an embodiment of the present invention.

Referring to FIG. 3, a radial cross-sectional view is shown of one embodiment of the spacer 100. As shown in FIG. 3, the at least two arcuate spacer segments 102, 104 collectively adjoin the ring 108. A ring axial width 114 may be greater than a spacer segment axial width 116.

Figure 4:
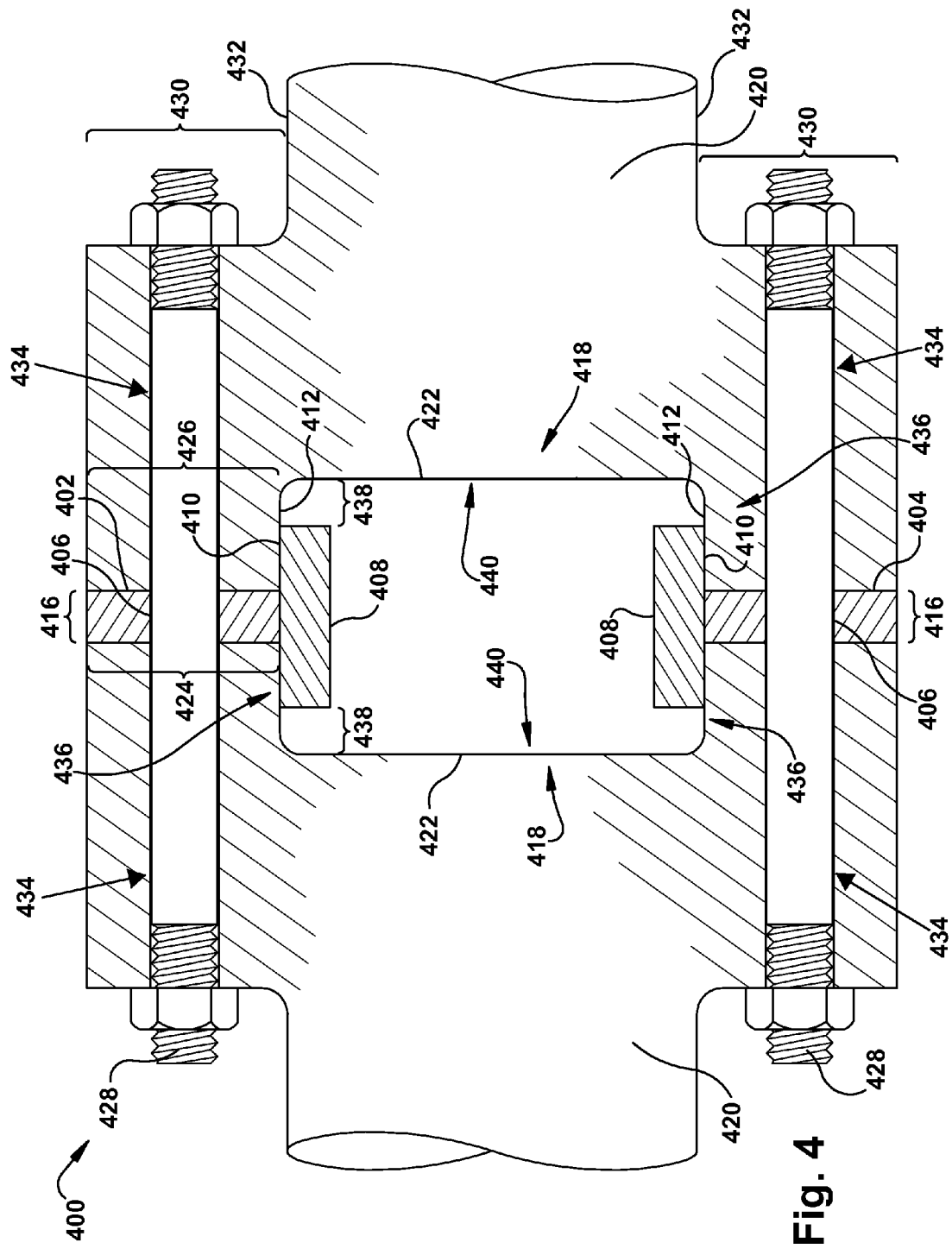
FIG. 4 shows a radial cross-sectional view of a spacer in accordance with an embodiment of the present invention.

Referring to FIG. 4, a radial cross-sectional view is shown of one embodiment of the spacer 400. As shown in FIG. 4, the at least two arcuate spacer segments 402, 404 fit between each of two respective end surfaces 418 of two concentric cylinders 420, each end surface 418 having a cylindrical seat 422. A spacer segment radial width 424 of each arcuate spacer segment 402, 404 may be approximately the same as a seat rim width 426 of the two concentric cylinders 420. Each arcuate spacer segment 402, 404 includes at least one spacer passage 406 for receiving the coupling bolt 428. At least two coupling bolts 428 will be deployed—at least one coupling bolt 428 for each arcuate spacer segment 402, 404. Depending upon the size (dimension and/or weight) of the concentric cylinders 420, it may be practical to include more than one coupling bolt 428 for each arcuate spacer segment 402, 404. The coupling bolt 428 may tighten the end surfaces 418 of the two concentric cylinders 420 against the at least two arcuate spacer segments 402, 404. The coupling bolt 428 passes through a flange 430 on an outer cylinder surface 432 of each concentric cylinder 420 near each end surface 418, each flange 430 having a flange passage 434 for receiving each coupling bolt 428. The spacer passage 406 on each arcuate spacer segment 402, 404 and the flange passage 434 may be slightly oversized when compared with the coupling bolt 428 allowing for a "loose fit" or a "sloppy fit." As is known in the art, "loose fit" or "sloppy fit" may be a clearance between the spacer and flange passages 406, 434 and the coupling bolt 428 of approximately thirty thousands of an inch or more on the diameter. The ring 408 may be shrink fit whereby the outer surface 410 of the ring 408 extends along the inner surface 412 of a wall 436 formed by the cylindrical seat 422 of each concentric cylinder 420. A clearance 438 between the ring 408 and a bottom 440 of the cylindrical seats 420 may provide the spacing needed to adjust the combined length of the concentric cylinders 420. The coupling bolt 428 may be adjusted to accommodate different widths of the least two arcuate spacer segments 402, 404. Each of the least two arcuate spacer segments 402, 404 are removable from between each of the respective end surfaces 418 with the cylindrical seats 422 in response to the coupling bolt 428 being removed. The ring 408 may maintain an alignment between the two concentric cylinders 420 in response to the coupling bolt 428 being removed.

The concentric cylinders 420 may be solid (rod-like) or hollow (pipe-like). The concentric cylinders 420 may be any length or width. The cylinder seat 420 may be a partial hole in the end of the concentric cylinder 420 or a hole extending through the concentric cylinder 420. The concentric cylinders 420 may be rotors of a steam or gas turbine. For example, the spacer 400 may hold an alignment of two rotors each rotor having an end surface with a cylindrical seat.

The concentric cylinders 420 may be joined with the spacer 400 between the respective end surfaces 418 of the concentric cylinders 420. If the combined length of the joined concentric cylinders 420 needs to be adjusted, the coupling bolts 428 may be removed. The ring 408 may hold the alignment of the concentric cylinders 420. Without changing the alignment of the concentric cylinders 420 each arcuate spacer segment 402, 404 may be removed from between the concentric cylinders 420. The spacer segment axial width 416 may be adjusted by machining each arcuate spacer segment 402, 404. After machining, each arcuate spacer segment 402, 404 may be re-inserted between the concentric cylinders 420 thereby adjusting the combined length of the concentric cylinders 420 while minimizing potential disruption to the alignment of the concentric cylinders 420. Alternatively to machining, each arcuate spacer segment 402, 404 could be replaced by a different arcuate spacer segment (not shown) having a different axial width (not shown) than the removed arcuate spacer segment. After all of the arcuate spacer segments 402, 404 are re-inserted, the coupling bolts 428 may be used to tighten the concentric cylinders 420 against each another.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof While various embodiments are described herein, it will be appreciated from the specification that various combinations of elements, variations or improvements therein may be made by those skilled in the art, and are within the scope of the invention. In addition, many modifications may be made to adapt a particular situation or material to the teachings of the invention without departing from essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A spacer, the spacer comprising:
   at least two arcuate spacer segments, wherein each of the at least two arcuate spacer segments has at least one spacer passage for receiving a part of a coupling bolt,
   wherein the at least two arcuate spacer segments fit between each of two respective end surfaces of two concentric cylinders, each end surface having a recessed cylindrical seat, and wherein each of the at least two arcuate spacer segments is removable from between each of the end surfaces with the recessed cylindrical seats in response to the coupling bolt being removed; and
   a ring with an outer surface adjoining an inner surface of each of the at least two arcuate spacer segments, wherein the ring and the at least two arcuate spacer segments are not unitary, and wherein the ring remains within the recessed cylindrical seats in response to the at least two arcuate spacer segments being removed.

2. The spacer of claim 1, wherein the at least two arcuate spacer segments include a machinable material.

3. The spacer of claim 1, wherein the at least two arcuate spacer segments collectively form an approximately 360 degree arc, and wherein each arcuate spacer segment is no greater than a 180 degree arc.

4. The spacer of claim 1, wherein a ring axial width is greater than a spacer segment axial width.

5. The spacer of claim 1, wherein a spacer segment radial width is approximately the same as a seat rim width of the two concentric cylinders.

6. The spacer of claim 5, wherein the coupling bolt tightens the end surfaces of the two concentric cylinders against the at least two arcuate spacer segments.

7. The spacer of claim 6, wherein the ring maintains an alignment between the two concentric cylinders in response to the coupling bolt being removed.

8. The spacer of claim 1, wherein an outer surface of the ring extends along an inner surface of a wall formed by the recessed cylindrical seat of each concentric cylinder.

9. The spacer of claim 1, wherein the coupling bolt adjusts to accommodate different spacer segment axial widths of the least two arcuate spacer segments.

10. A spacer for holding an alignment of two rotors each rotor having an end surface with a recessed cylindrical seat, the spacer comprising:
    at least two arcuate spacer segments, wherein each of the at least two arcuate spacer segments has at least one spacer passage for receiving a part of a coupling bolt,
    wherein the at least two arcuate spacer segments fit between each of the respective end surfaces with the recessed cylindrical seats, and wherein each of the at least two arcuate spacer segments is removable from between each of the end surfaces with the recessed cylindrical seats in response to the coupling bolt being removed; and
    a ring with an outer surface adjoining an inner surface of each of the at least two arcuate spacer segments, wherein the ring and the at least two arcuate spacer segments are not unitary, and wherein the ring remains within the recessed cylindrical seats in response to the at least two arcuate spacer segments being removed.

11. The spacer of claim 10, wherein the at least two arcuate spacer segments include a machinable material.

12. The spacer of claim 10, wherein the at least two arcuate spacer segments collectively form an approximately 360 degree arc, and wherein each arcuate spacer segment is no greater than a 180 degree arc.

13. The spacer of claim 10, wherein a ring axial width is greater than a spacer segment axial width.

14. The spacer of claim 10, wherein a spacer segment radial width is approximately the same as a seat rim width of the two rotors.

15. The spacer of claim 10, wherein an outer surface of the ring extends along an inner surface of a wall formed by the recessed cylindrical seat of each rotor.

16. The spacer of claim 15, wherein the coupling bolt adjusts to accommodate different spacer segment axial widths of the least two arcuate spacer segments.

17. A method for maintaining an axial alignment of at least two concentric cylinders, the method comprising:
joining at least two concentric cylinders by an end surface with a recessed cylindrical seat of each concentric cylinder and a spacer between the two respective end surfaces each with the recessed cylindrical seats, wherein the spacer includes at least two arcuate spacer segments and a ring, wherein the ring and the at least two arcuate spacer segments are not unitary;
aligning the axial alignment of the at least two concentric cylinders;
removing the at least two arcuate spacer segments from between each of the end surfaces with the recessed cylindrical seats of the at least two concentric cylinders wherein the ring remains within the recessed cylindrical seats in response to the at least two arcuate spacer segments being removed;
adjusting an axial width of the at least two arcuate spacer segments;
inserting the at least two arcuate spacer segments between the at least two concentric cylinders; and
rejoining the at least two concentric cylinders by an end surface of each concentric cylinder.

18. The method of claim 17, wherein the adjusting includes machining the axial width of the at least two arcuate spacer segments to a narrower axial width.

19. The method of claim 17, wherein the adjusting includes substituting the at least two arcuate spacer segments with a different axial width set of at least two arcuate spacer segments.

* * * * *